May 4, 1926.

F. E. HOWE 1,583,716

PRUNE SPREADER

Filed July 2, 1925

INVENTOR.
F. E. Howe,
BY Geo. F. Kimmel
ATTORNEY.

May 4, 1926. 1,583,716
F. E. HOWE
PRUNE SPREADER
Filed July 2, 1925 5 Sheets-Sheet 2

Fig. 2.

INVENTOR.
F. E. Howe,
BY Geo. F. Kimmel
ATTORNEY.

May 4, 1926.

F. E. HOWE

PRUNE SPREADER

Filed July 2, 1925

INVENTOR.
F.E.Howe,
BY
Geo.F.Kimmel ATTORNEY.

Patented May 4, 1926.

1,583,716

UNITED STATES PATENT OFFICE.

FREDERICK E. HOWE, OF FALLS CITY, OREGON.

PRUNE SPREADER.

Application filed July 2, 1925. Serial No. 41,156.

*To all whom it may concern:*

Be it known that I, FREDERICK E. HOWE, a citizen of the United States, residing at Falls City, in the county of Polk and State of Oregon, have invented certain new and useful Improvements in Prune Spreaders, of which the following is a specification.

This invention relates to machines for washing, draining and spreading prunes upon trays for drying.

The primary object of this invention is the provision, in a manner as hereinafter set forth, of a machine which will expedite the washing, draining and spreading of prunes upon drying trays and which will enable one person to perform all of these functions easily and quickly thus saving labor expense as well as increasing the speed with which the prunes can be washed and spread upon the drying trays.

Another object of the invention is the provision, in a manner as hereinafter set forth, in a machine of the above described type, of a means for lifting the prunes or any other fruit which may be used in this machine, from the washing tank to a point above a drain tray and dumping the fruit upon this tray and automatically returning to the washing tank for another charge of fruit, without further attention.

Another object is the provision, in connection with a machine of this type, in a manner as hereinafter set forth, of a shaker tray in which the washed fruit is placed to have the liquid adhering thereto thoroughly shaken therefrom before discharge upon the drying frame and further, having means whereby the shaking of the tray is automatically started when a controlling gate at the end of the tray is opened for the discharge of the fruit therefrom.

A still further object of the invention is the provision, in a manner as hereinafter set forth, of a means for receiving and spreading upon a drying frame a single layer, or two or more layers of a fruit which is to be dried.

Yet another object of the invention is the provision, in a manner as hereinafter set forth, of a means for automatically raising and uncovering a fruit tray after the desired number of layers of fruit have been arranged thereover, for the quick and easy removal of the filled tray and the insertion of an empty tray to be filled.

A final object of the invention is the provision, in a manner as hereinafter set forth, of a fruit washing, draining and spreading machine of the character above set forth, which will be of simple construction, easily manipulated and controllable by a single person for the performance of all of the functions set forth, and having few working points to require the attention of the operator.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claims.

In the drawings:—

Referring now to the drawings in detail wherein like numerals of reference indicate corresponding parts throughout the several views, the specific structure of the machine will be first set forth and thereafter a detailed explanation of the working of the machine will be given.

The machine comprises a base structure comprising a frame having a pair of elongated parallel bottom side beams 1 and superposed parallel top side beams 2, the top and the bottom beams being connected by the uprights 3 setting up the four corner posts of the base and these corner posts have extending therebetween and connecting the tops and bottoms thereof, the end rails 4 and 5 respectively.

At approximately the central portion of the base structure just described, there is positioned a vertical frame structure having the side members 6 which are secured across the outer faces of the top and bottom side beams 1 and 2 and extend inwardly a short distance across the top of the upper beams 2 as indicated at 7 and then continue upwardly a substantial distance above the base structure and these side members are connected across the structure at their upper ends by the top bar 8.

Extending from and connected at one end to the uprights 6 at a substantial distance above the base structure, and extending downwardly therefrom at an inclination toward the front of the machine, is a pair of parallel bars 9, the forward end of each bar being downturned as at 10 to provide the vertical posts the lower ends of which posts are secured to a top rail 2 rearwardly of the forward ends of the rails. These parallel bars 9 and their angled portions 10 constitute a supporting super-structure upon the base, for the purpose to be hereinafter set forth.

The rear portion of the base structure lying between the rear corner posts 3, the side standards 6 and the top and bottom side beams 1 and 2 is enclosed to set up a fluid tank 11, open at the top and having secured upon the inner face of each side wall thereof an angled bracket 12 as shown.

Figure 5:
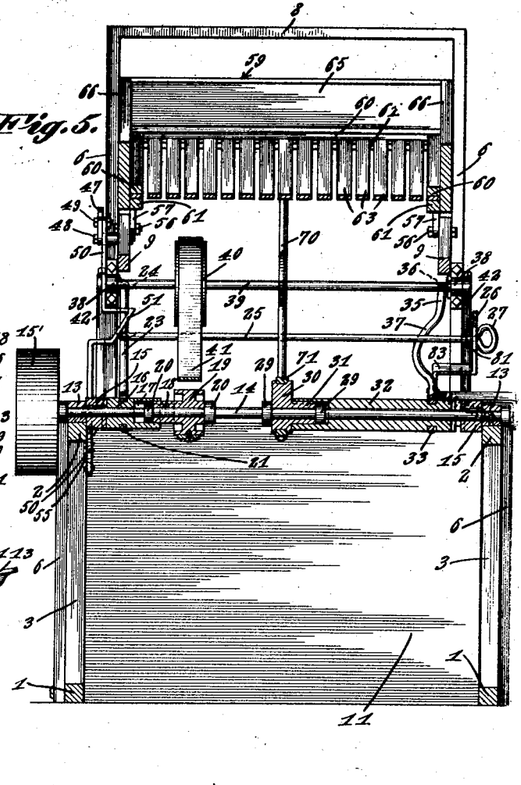
Figure 5 is a transverse section taken upon the line 5—5 of Figure 1.

Mounted upon the beams 2 of the base structure are bearings 13 and mounted in these bearings are the ends of a revoluble shaft 14 which extends across the base of the machine as is shown in Figure 5 and there is mounted upon one end of the shaft 14 which extends beyond one of the bearings a power pulley 15' about which a drive belt (not shown) may be passed There is keyed to the shaft 14 adjacent the inner side of each of the bearings 13 a clutch member 15. Mounted upon the shaft adjacent one of the members 15 is a clutch sleeve 16 adapted to be engaged under proper conditions with the adjacent member 15 to be revolved thereby and one end of this sleeve is tubular as indicated at 17 to slide over and engage an extended hub 18 of a relatively small pulley member 19 which is mounted to idle upon the shaft 14 and held against longitudinal movement thereon by means of the end collars 20. Loosely mounted in an annular groove formed in the body of the sleeve 16 is a ring 21 to which there is secured at diametrically opposite points the ends of a yoke 22 carried upon the end of an elevator clutch actuating rod 23, the upper end of which rod is pivotally secured as at 24 to the inner face of an adjacent upright member 6. This elevator clutch actuating rod 23 has pivotally connected thereto a control bar 25 which extends across the machine through a support bracket 26 mounted upon the opposite upright member 6, where it terminates in a looped end 27.

Mounted to idle about the shaft 14 adjacent the central portion thereof, and between a pair of retaining collars 29 is an eccentric disc 30 having a sleeve hub 31 formed integral therewith as is shown. Mounted to idle upon the shaft adjacent the end of the hub 31 is a sleeve 32 having one end tubular to slide over the end of the hub 31 and having the other end formed for engagement, under proper conditions, with the clutch member 15 upon the other end of the shaft 14. This sleeve 32 has an annular recess formed thereabout adjacent the clutch engaging end and in this recess there is loosely mounted a collar 33 to which there is secured at diametrically opposite points the ends of a yoke 34 formed integral with the sleeve actuating rod 35, the upper end of which is pivotally connected as at 36 to the side upright 6. The central portion of this sleeve actuating rod 35 has an arched off set portion 37 adjacent the central part thereof as is shown, the purpose of which will become apparent upon further description of the machine.

Figure 3:
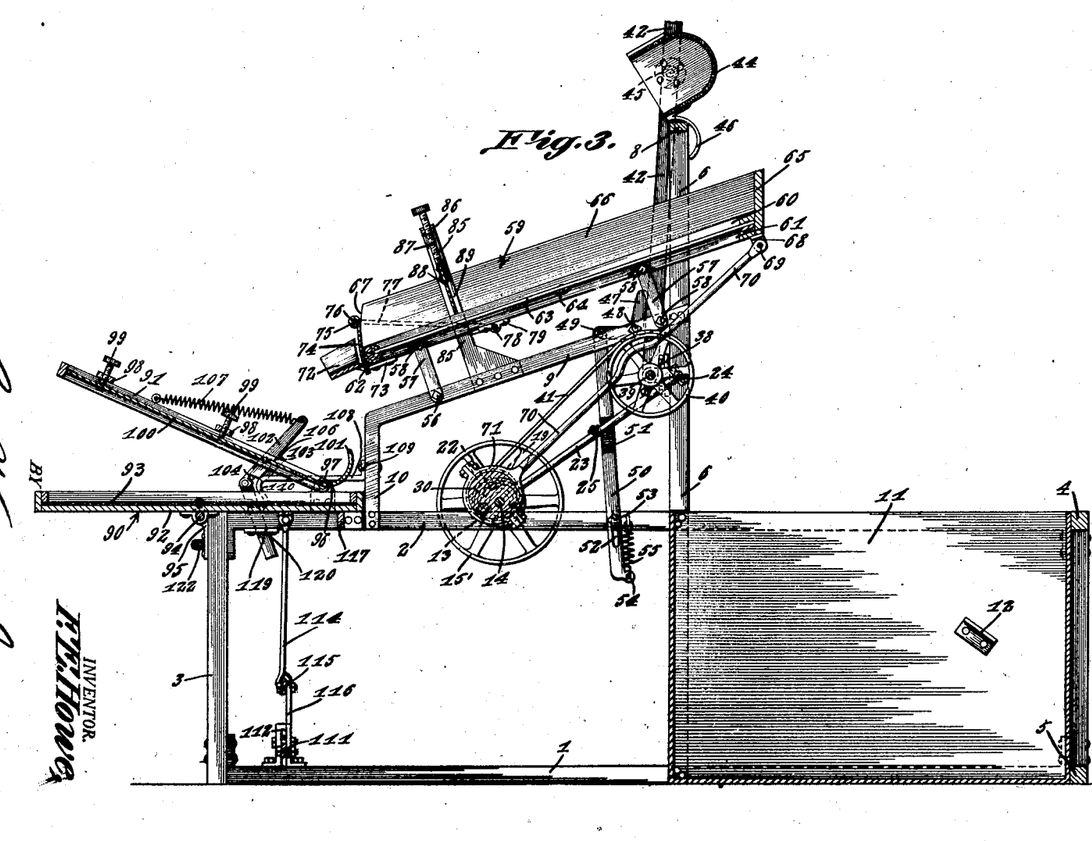
Figure 3 is a central longitudinal section taken upon the line 3—3 of Figure 2.
Figure 4:
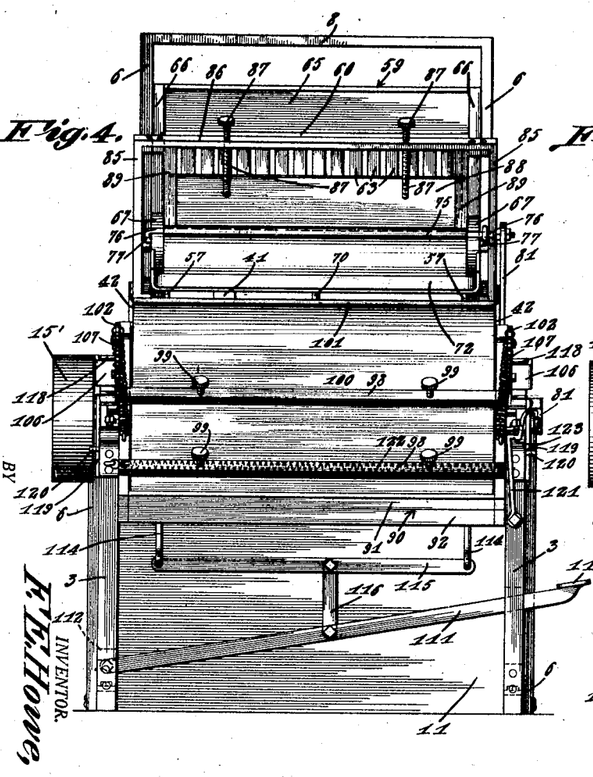
Figure 4 is an end elevation of the machine.

Mounted upon the front edges of the upright 6 a substantial distance above the side beams 2 of the base structure are bearings 38 and mounted in these bearings are the ends of a revoluble shaft 39 which may be termed the elevator shaft. Mounted upon this elevator shaft in alignment with the pulley 19 upon the shaft 14, is a pulley 40 of greater diameter than the pulley 19 and connecting these pulleys 19 and 40 is a strap 41 having one free end secured to the pulley 40 and the other free end secured to the pulley 19 as is shown in Figures 1, 3 and 5.

An elevator frame is provided, which frame comprises a pair of relatively long side bars 42 each having one end secured to one end of the shaft 39, and having their other ends connected by the cross bar 43. This elevator frame when in the normal at rest position is arranged in the position shown in Figure 1 and the free rear end thereof rests upon the angled brackets 12 in the tank 11.

Figure 2:
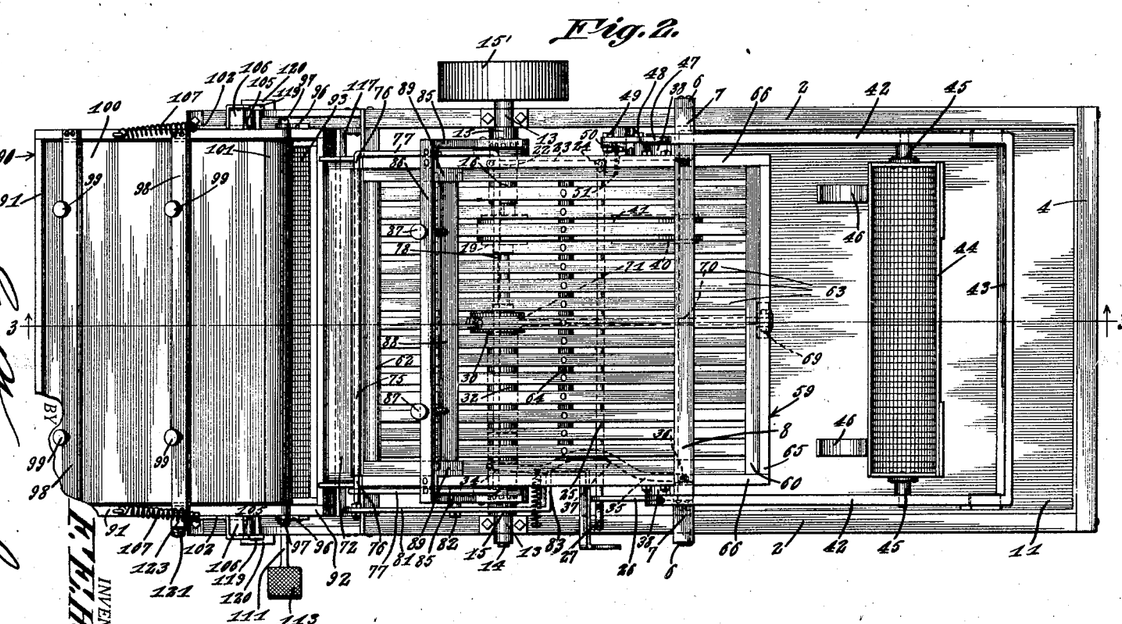
Figure 2 is a top plan view of the same.

Located within the elevator frame and extending between the side bars 42 thereof, is a wire or foraminous basket 44 having the end trunnions 45 which are pivotally secured in the side bars 42 as shown in Figure 2 of the drawings.

Figure 1:
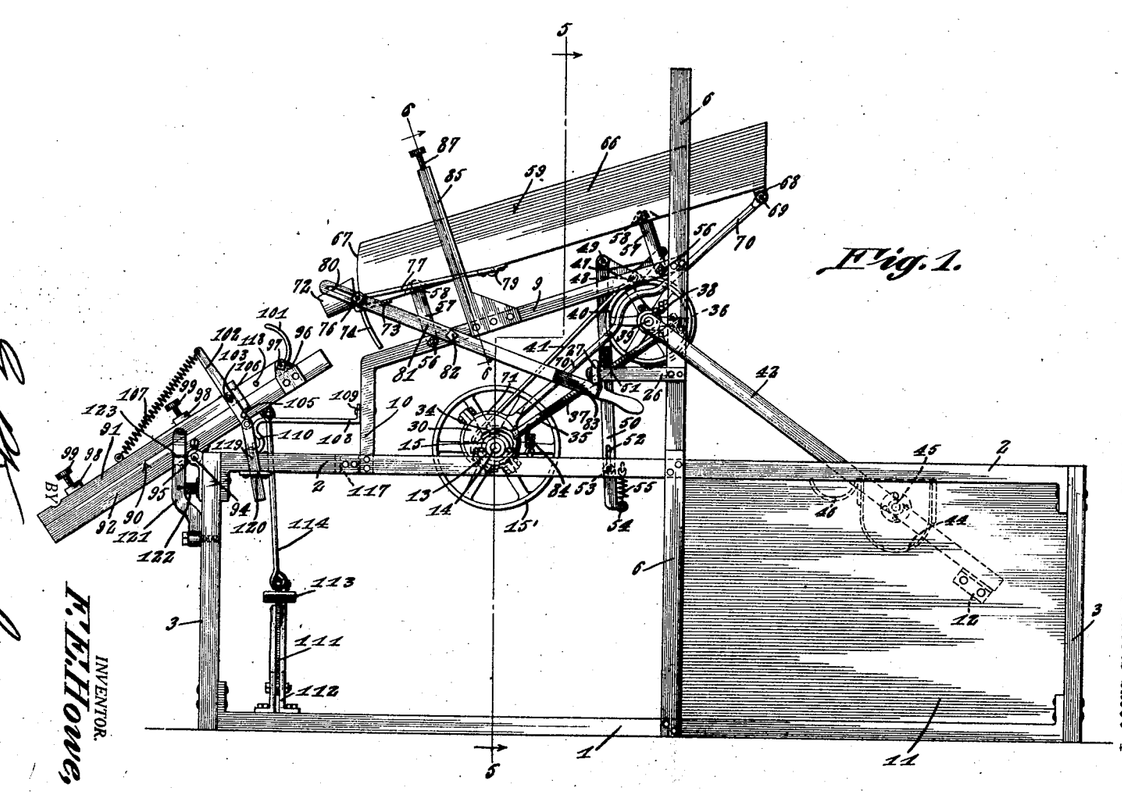
Figure 1 is a side elevation of the machine embodying this invention.

This basket is adapted to be lowered into the tank with the swinging end of the elevator frame, to the position indicated in dotted lines in Figure 1 of the drawings. Secured to the front long side of the basket 44 are a pair of dumping hooks 46 which, when the basket is swung upwardly to the limit of its movement, engage the cross bar 8 as shown in Figure 2 to dump the contents of the basket.

When the basket 44 is swung to the upright position shown in Figure 3 of the drawings, through the engagement of the sleeve 16 with the clutch member 15 adjacent thereto which is keyed to the shaft 14, and which causes the revolution of the pulley 19 to revolve the pulley 40 and shaft 39 through the medium of the attached belt 41, one of the side bars 42 of the elevator frame contacts with one arm of a bell crank member 47 which is pivotally mounted as at 48 to the adjacent superstructure side bar 9, and when causing this bell crank member to turn upon its pivots the other arm thereof which is pivotally connected as at 49 to the upper end of a shiftable release rod 50, causes the release rod 50 to move downwardly to force the angled off set portion 51 thereof against the elevator clutch actuating bar 23 thus forcing the bar inwardly and disengaging the lever 16 from the clutch member 15. The elevator frame is then free and will fall through the force of gravity back to the position shown in Figure 1. The lower ends of the release bar 50 have a slot 52 formed therethrough and through this slot is passed the retaining bolt 53 which is secured in the side beams 2 of the base and because of this guide bolt the bar 50 is made to travel in a substantially vertical manner. The lower end of the bar 50 is off set and provided with the eye 54 to which one end of a spring 55 is secured, the other end of the spring being secured to the side beams 2 and acting to move the bar 50 upwardly to its normal position after the side rail of the elevator frame has moved away from or out of engagement with the bell crank lever 47. The clutch engaging sleeve 16 is then ready to be moved into engagement again through the longitudinal shifting of the bar 25, when it is again desired to lift the elevator and basket to the position shown in Figure 3.

Pivotally secured by means of the bolts 56 to each of the superstructure side rails 9, is a pair of normally upstanding supporting links 57. These links 57 are pivotally secured by bolts 58 to the bottom of a draining frame indicated as a whole by the numeral 59. This draining frame comprises a bottom portion formed of a pair of spaced superposed three sided frames 60 and 61 respectively, the ends at the open side being secured to a tubular member 62 which extends across the front or discharge end of the drain tray 56. This tubular member 62 is split longitudinally and into the split portion of this member there is extended one end of each of a series of longitudinally extending spaced steel slats 63 which constitute the bottom of the tray. The other ends of these slats are secured between the frames 60 and 61 as is shown in Figure 3, and there is extended transversely of the under side of the slats a supporting bar 64 which serves to strengthen the central portion of the tray bottom. The ends of the slats which extend into the split tubular member 62 are secured in position by pouring into the tubular member some sealing compound such as Babbitt metal and by this means the slats are firmly secured in position and will not work loose through the shaking movement of the drain frame. The frame is provided with upright side and back guard boards 65 and 66 respectively, the front edges of these side guard boards 66 being curved as indicated at 67 to allow for the movement there across of a swinging gate which will be hereinafter described.

Secured to the under side of the drain frame 59 at the back central portion thereof is a pair of depending spaced ears 68 between which there is secured by means of the bolts 69 one end of a joggle bar 70, the other end of which is formed to provide one half of the split eccentric collar 71 which is secured about the eccentric disc 30.

At the forward end of the draining rack 59, there is located a discharge lip 72 which lip is held forwardly of the front edge of the structure by means of the tongues 73 which are secured to the under side thereof.

A cut off gate 74 is provided for closing the end of the draining frame 59 and this gate is adapted to be moved up and down between the end of the frame and the lip 72 to open and close the frame. The upper edge of the gate is rolled as indicated at 75 and there is extended through this rolled edge a bar 76 which bar forms one side of a frame having the end members 77 which extend at a downward inclination toward the rear of the draining frame 59 and the rear cross connecting bar 78 which extends beneath the under side of the draining frame and which is held to this under side by means of the bearings 79. One end of the bar 76 is extended and passes through the slot 80 which is formed in the upper end of a gate actuating lever 81 which is pivotally connected intermediate its end by the bolt 82 to one of the superstructure bars 9. This gate actuating bar extends downwardly and is inset at its lower end as indicated at 83 and this inset portion is adapted to bear against the curved portion 37 of the sleeve shifting bar 35 as clearly shown in Figure 5 of the drawings, in such a manner that when the bar is swung downwardly the inset portion 83 thereof will bear against the curved portion 37 of the bar 35 and disconnect the sleeve 32 from the clutch member 15 adjacent thereto to stop the shaking of the drain tray 59. This same action of the gate closing bar 81 serves to move the gate 74 upwardly across the end of the draining tray to close the tray. When the lower free end of the actuating bar 81 is swung upwardly, the bar 35 will be released by the off set portion 83 and the spring 84 will act to draw the bar 35 and sleeve 32 over to engage the end of the sleeve with the adjacent clutch member 15 thus starting the revolution of the eccentric disc 30 to shake the frame to cause the fruit therein to be shaken through the gate which was opened when the free end of the bar 81 was lifted.

The sleeves 16 and 32 are in toothed engagement with their respective hubs 18 and 31 to allow longitudinal movement of the sleeves upon their hubs and to cause the hubs to be revolved with the sleeves when the sleeves are engaged with the clutch members 15.

Figure 6:
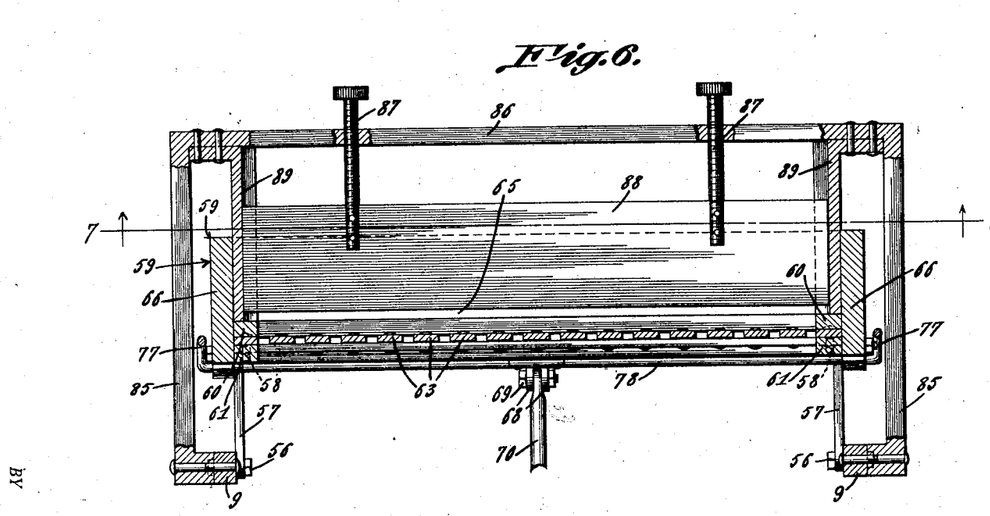
Figure 6 is a section taken upon the line 6—6 of Figure 1.
Figure 7:
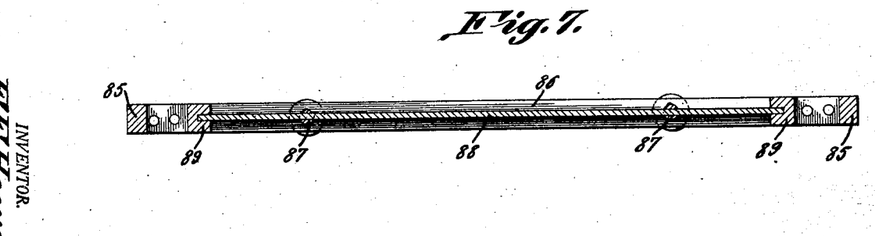
Figure 7 is a section taken upon the line 7—7 of Figure 6.

Supported upon the superstructure bars 9 is an arch structure which overlies the draining frame 59 and this structure comprises vertical side members 85 the lower ends of which are secured to the bars 9, and the top cross connecting bar 86. Passed through this top connecting bar 86 is a pair of threaded adjusting screws 87, the lower ends of which are secured to a gate 88, the ends of which gate ride in and are guided by the slotted members 89 which are outturned at their upper ends and secured to the under side of the cross bar 86 as clearly shown in Figure 6 of the drawings. The screws 87 when revolved will thus raise or lower the gate 88 from the slat bottom of the tray to allow fruit to pass therebeneath, and this gate serves to keep the fruit shaken up and moving forwardly in the frame as the frame reciprocates back and forth thereabeneath. It will be noted that the arched frame is independent of the draining frame, as well as the gate 88 and this gate and frame remain stationary while the draining frame moves back and forth beneath.

Positioned upon the forward end of the base structure in front of the vertical legs 10 of the superstructure, is a drying screen holding frame structure indicated generally in Figure 1 by the numeral 90. This drying screen holding structure comprises an upper frame 91 and a lower frame 92. The lower frame as shown in Figure 3 is adapted to support upon the bottom thereof the wire screen 93 upon which the washed fruit is shaken from the drying draining frame 59. The structure 90 is pivotally mounted to swing upon the trunnions 94 which are secured beneath the central portion at each side of the structure. These trunnions are mounted in bearings 95 which are secured to the front top portion of the base structure of the machine.

Adjacent the rear portion of the lower frame 92 and upon each side thereof is an upstanding bearing element 96 and the rear portion of the top frame 91 is provided with the laterally extending pivot bolts 97 which are mounted in the bearings to allow the top frame 91 to swing upwardly upon the lower frame to the position shown in Figure 3, when the drying screen 93 is to be removed from the frame.

It will be noted that the top frame 91 has three sides only, the rear thereof having no cross connecting bar, and there is extended across between the side bars of the frame 91 the stretchers 98 through each of which a pair of adjusting screws 99 is passed. The lower ends of these adjusting screws are pivotally secured in a plate 100 which fits snugly in the frame 91 and this plate has the rear portion thereof rolled upwardly as indicated at 101. When the top frame is down upon the lower frame 92 and a drying screen 93 is in position, the plate 100 can be adjusted up or down above the drying screen 93 in such a manner that the fruit which leaves the lip 72 of the draning frame will pass beneath the curved portion 101, when the structure 90 is in the position shown in Figure 1, to form a single or a double layer of fruit upon the drying screen, as desired.

A locking mechanism is provided for securing the top and bottom frames 91 and 92 of the structure 90 together, while fruit is being passed thereinto upon the drying screen 93. This locking mechanism comprises a latch lever 102 pivotally secured intermediate its end to the top frame 91 adjacent its rear as indicated at 103, and this latch has formed therein adjacent the lower end thereof the notch 104 which, when the frames are closed engages over a pin 105 projecting laterally from the side of the lower frame 92. The latches 102 are provided with laterally extending lips 106 along their rear edges which lips form a part of an automatically acting releasing mechanism for unlatching the frames when the same are swung upon their trunnions 94 in to the opening position. Tension springs 107 are provided, one end of each of which is secured to the upper end of a latch member 102 while the other ends thereof are secured to the top frame 91.

In order to unhook the latch member 102 when the frame structure 90 is swung downwardly at its rear for opening and for removal of the drying screen, there is provided a pair of latch operating mechanisms 108 each comprising an elongated bar having one end upturned and secured as at 109 to the forward face of an upright 10, and having the other end merging with the top portion of a substantially S-shaped member 110, the lower end of this S-shaped member being secured to the top of the adjacent beam 2, near the forward end thereof as clearly shown in Figures 1 and 3.

In order to swing the frame structure 90, easily, there is provided the foot lever 111 secured at one end between a pair of ears 112 located upon one lower side beam 1 of the base, and this lever 111 extends across the base and beyond the outer side thereof and has thereon a foot pedal 113. Suspended from each side of the frame structure 90 adjacent the rear portion of the frame, is a link member 114 pivotally secured at its upper end to its respective side of the frame structure and there is extended across between and connecting the lower ends of these link members 114 a connecting bar 115 and from the central portion of this connecting bar there depends a link member 116 connecting the bar 115 with the central portion of the foot lever 111. It is evident that upon depression of the free ends of the foot lever 111 that the links 116 will be drawn downwardly thus pulling down upon the line 114 and swinging the frame structure 90 upon the trunnions 94, to the horizontal position shown in Figure 3. The rear portion of the frame structure when depressed to this horizontal position then rests upon a cross supporting bar 117 which connects across between the beams 2.

Upon the downward movement of the rear of this frame structure 90, by the depression of the foot lever 111 as above explained, the flanged portion or lip 106 of the latch 102 will abut the bulging out upward part of the S-shaped member 110 and as it rides thereover, the latch will be swung upon its pivot 103 and the notch disengaged from the pin 105 thus disconnecting the upper and lower frames 91 and 92. At the same time, upon the downward movement of the rear portion of the frame structure 90, the pins 118 which are located one in each side rail of the top frame 91 adjacent the rear end thereof, and projecting laterally therefrom, will bear down upon the top of the horizontal portion of the adjacent member 108 and will cause the top frame 91 to open upon its pivots 97 which are mounted in the bearings 96 carried by the lower frame 92. The frame structure will then assume the position shown in Figure 3 of the drawings uncovering the screen 93 for the removal of the same from the lower frame 92. In order to guide the latch member back properly to engaging position with the pin 105 when the frame is allowed to assume the closed inclined position as shown in Figure 1, there is pivotally connected to the lower end of the link 102 a guide member 119 which members slide through guide yokes 120 carried by the side beams 2 of the base structure.

In order to retain the frame structure 90 in a horizontal open position as shown in Figure 3, without the constant attention of the operator of the machine, there is provided a latch 121 upon one of the forward uprights 3 of the base structure and this latch is controlled by the spring member 122 which extends across the base and is secured to the opposite side thereof to cause the latch to be drawn inwardly against the side of the frame structure at all times. The upper portion of the latch is off set as at 123 so that when the outer portion of the frame structure 90 swings upwardly it will ride over this off set portion and the spring 122 will draw the latch across so that the off set moves beneath the frame structure and latches the structure in horizontal position.

The operation of this machine is as follows:—

Starting with the machine set as shown in Figure 1 of the drawings, the basket 44, filled with the fruit to be washed and spread out, is lowered into the washing solution contained in the tank 11. The power pulleys 15' and the shaft 14 is in motion at all times. When the fruit has been washed in the solution the required length of time, the operator of the machine grasps the handle 27 and forces the bar 25 in across the body of the machine to shift the elevator clutch operating rod 23. This causes the sleeve 16 to slide over into engagement with the adjacent clutch member 15 thus throwing the elements 15, 16, 18 and 19 into engagement and causing the revolution of the pulley wheel 19. When this pulley begins to revolve the strap 41 will be wound thereabout and the other end of the strap will be unwound from the pulley 40 which is mounted upon the shaft 39, causing this shaft to revolve and also causing the elevator frame composed of the bars 42 and 43 to swing upwardly carrying the filled basket 44 therewith.

The elevating mechanism swings to the position in which it is shown in Figure 3 of the drawings whereupon the hooped elements 46 carried by the basket 44 will engage the cross bar 8 of the upright frame causing the basket to be tilted to dump the contents thereof into the draining frame 59. When the elevator structure has reached the limit of its upward movement and the basket 44 has been dumped, one of the side bars 42 contacts with one arm of the bell crank lever 47 causing the swinging of the same which swinging forces the vertical bar 50, which is connected to the other arm thereof, downwardly bringing the off set portion 51 thereof into contact with the elevator clutch operating bar 23 and due to the inclined surface of this off set portion 51 the bar 23 will be forced over thus disengaging the sleeve 16 from the clutch member 15. The elevator structure is now released and will fall backward to the position in which it is shown in Figure 1.

The fruit is now in the draining tray 59, with the gate 74 closed and with the frame structure 90 in the position shown in Figure 1 with a drying screen therein ready to receive the fruit.

The next step in the operation of the machine is the swinging by the operator of the gate 74 opening lever 81. The lower free end of this lever 81 is swung upwardly and when the lever is thus swung to open the gate 74 the off set portion 83 which has normally been bearing against the forward curved portion 37 of the sleeve 32 shifting bar 35, will move away from the bar and will allow the spring 84 connected thereto to draw the bar and the attached sleeve 32 over into engagement with the constantly revolving adjacent clutch member 15. This engagement of the sleeve 32 with its adjacent clutch member 15 throws into motion the hub 29 and attached disc 30 thus setting up the reciprocating movement of the bar 70 and the consequent reciprocating or shaking motion of the draining frame 59. When this motion is begun the fruit is thus shaken down past the gate 88 and is delivered from the spout 72 of the forward end of the frame down behind the curved portion 101 of the adjustable plate 100 which is carried in the top frame 91 of the structure 90. If this plate 100 has been so adjusted above the screen 93 that a single layer of fruit only can be deposited upon this screen, then the fruit will roll beneath this plate and spread itself in a single layer upon the screen 93. When the proper amount of fruit has been shaken from the draining tray 59 the operator draws down upon the free end of the sleeve actuating lever 81 thus closing the gate and at the same time causing the inset portion 83 to bear against the curved portion 37 of the sleeve shifting rod 35, to shift the sleeve out of engagement with the clutch member 15 which is adjacent the end thereof. The shaking of the draining frame 59 is thus stopped with the closing of the gate 74 and if desired during the next operation of the machine, the basket 44 can again be thrown into engagement with the power shaft to deliver more fruit to the draining tray.

The next step of the operator of the machine is to place his foot upon the pedal 113 of the lever 111 thus drawing down upon the rear of the frame structure 90 which drawing down operation will cause the disengagement of the latch 102 with the pin 105 as described in the body of this specification, and at the same time will cause the pin 118 to contact with the top of the member 108 thus swinging upwardly the forward portion of the frame 91 upon its pivots 97. At the same time the latch member 121 will operate to lock the frame in the horizontal open position shown in Figure 3 of the drawings. The filled drying screen 93 can then be quickly removed from the frame by the operator of the machine or by an attendant and an empty screen placed in position to be closed within the frame, and the frame released from engagement with the latch 121 to allow it to return to the position shown in Figure 1 to receive another charge of the fruit which has been in the meantime draining in the frame 59.

From the foregoing description it will be readily seen that there has been provided a fruit washing, draining and spreading machine which is of novel construction, simple of operation and capable of performing the work at the present time performed by many persons, with the attention of only a single person.

Having thus described my invention what I claim is:—

1. In a machine of the character set forth, a washing tank, a reciprocatory tray, mechanism for imparting the reciprocatory movement to said tray, clutch elements associated with said mechanism, means for elevating fruit from said tank to said tray through the engagement of certain of said elements, and means operable by said elevating means, upon delivery of the contents thereof after elevation, for releasing the said clutch elements to disconnect the elevating means from said mechanism.

2. In a machine of the character set forth, a washing tank, a reciprocatory tray, mechanism for imparting the reciprocatory movement to said tray, means connectible with said mechanism for delivering fruit from the said tank into said tray, means for receiving fruit from said tray and spreading the same for drying purposes, and means for controlling the delivery of fruit from said tray to said receiving means.

3. In a machine of the character set forth, a washing tank, a reciprocatory tray, mechanism for imparting the reciprocatory movement to said tray, means connectible with said mechanism for delivering fruit from the said tank into said tray, means for receiving fruit from said tray and spreading the same for drying purposes, means for controlling the delivery of fruit from said tray to said receiving means, and means whereby the movement of said tray may be stopped or started together with the operation of said fruit delivery controlling means.

4. In a machine of the character set forth, a tank, a shaking tray, pivotal elements supporting said tray for reciprocatory movement, clutch controlled mechanism for imparting reciprocatory movement to said tray, means connectible with said mechanism for delivering fruit to said tray, means for receiving fruit from said tray for spreading the same for drying, and a gate for said tray controlling the delivery of fruit from the tray to said receiving means.

5. In a machine of the character set forth, a tank, a shaking tray, pivotal elements supporting said tray for reciprocatory movement, clutch controlled mechanism for imparting reciprocatory movement to said tray, means connectible with said mechanism for delivering fruit to said tray, means for receiving fruit from said tray for spreading the same for drying, a gate controlling the delivery of fruit from said tray to said receiving means, and an actuating lever for said gate.

6. In a machine of the character set forth, a tank, a shaking tray, pivotal elements supporting said tray for reciprocatory movement, clutch controlled mechanism for imparting reciprocatory movement to said tray, means connectible with said mechanism for delivering fruit to said tray, means for receiving fruit from said tray for spreading the same for drying, a gate controlling the delivery of fruit from said tray to said receiving means, and an actuating lever for said gate, said actuating lever, when moved to actuate said gate, shifting said clutch mechanism to engage or disengage the same.

7. In a machine of the character set forth, a washing tank, a reciprocatory draining tray mounted over the same, a combined elevating and dumping element for delivering fruit from said tank to said tray, and a stationary blade suspended above and extending into said tray to agitate the fruit therein during the reciprocation of the tray.

8. In a machine of the character set forth, a washing tank, a reciprocatory draining tray mounted over the same, a combined elevating and dumping element for delivering fruit from said tank to said tray, a stationary blade suspended above and extending into said tray to agitate the fruit therein during the reciprocation of the tray, and a manually controlled sliding gate extending across the front end of said tray for controlling the delivery of fruit therefrom.

9. In a machine of the character set forth, a washing tank, a reciprocatory draining tray mounted over the same, power mechanism adapted to be connected to said tray to cause the reciprocation thereof, a combined elevating and dumping element operated by said mechanism for delivering fruit to said tray from said tank, means for receiving fruit from said tray for spreading the same, a gate extending across the end of said tray for controlling the delivery of fruit therefrom, a controlling lever for said gate, and means whereby the reciprocation of said tray will be stopped upon actuating said lever to close the gate.

10. In a machine of the character set forth, the combination with a draining tray and a means for delivering washed fruit thereto, of a spreading device comprising, a pair of frames adapted to hold a drying screen therebetween for the spreading thereon of fruit, delivered from said tray, to be dried.

11. In a machine of the character set forth, the combination with a draining tray and a means for delivering washed fruit thereto, of a spreading device comprising, a pair of frames adapted to hold a drying screen therebetween for the spreading thereon of fruit, delivered from said tray, to be dried, and means for automatically regulating the number of layers of fruit to be deposited upon said screen.

12. In a machine of the character set forth, the combination with a draining tray and a means for delivering washed fruit thereto, of a spreading device comprising, a pair of superposed frames, a hinged connection between the same adjacent the rear ends thereof, means for holding a drying screen between said frames, and means for guiding fruit onto said screen as it is delivered from said draining tray.

13. In a machine of the character set forth, the combination with a draining tray and a means for delivering washed fruit thereto, of a spreading device comprising, a pair of superposed frames, a hinged connection therebetween adjacent the rear ends thereof, a latching element between the frames to secure therebetween a drying frame adapted to receive thereon fruit from said tray, means for pivotally supporting said frames, and an automatically operating unlatching and opening means for said frames acting when the frames are swung on their pivots to a horizontal position.

14. In a machine of the character set forth, the combination with a draining tray and a means for delivering washed fruit thereto, of a spreading device comprising, a pair of superposed frames, a hinged connection between the same adjacent the rear ends thereof, a latching element between the frames to secure therebetween a drying screen adapted to receive thereon fruit from said tray, means for pivotally supporting said frames, an adjustable element in the top one of said frames for regulating the amount of fruit to be spread upon said screen, means for swinging said frames to a horizontal position for opening, and a combined latch releasing and frame opening means operating automatically when said means for swinging said frames to the horizontal position, if actuated.

In testimony whereof, I affix my signature hereto.

FREDERICK E. HOWE.